United States Patent [19]

Coleman

[11] Patent Number: 4,995,766
[45] Date of Patent: Feb. 26, 1991

[54] INSERT CUTTER

[75] Inventor: Robert L. Coleman, Oxford, Mich.

[73] Assignee: GTE Valenite Corporation

[21] Appl. No.: 392,875

[22] Filed: Aug. 14, 1989

[51] Int. Cl.$^5$ .............................. B23C 5/00; B23C 5/02
[52] U.S. Cl. ........................................ 407/34; 407/40; 407/42; 407/48; 407/53; 407/61; 407/104
[58] Field of Search ...................... 407/33, 34, 40, 42, 407/47, 48, 51, 53, 61, 62, 69, 100, 103, 104, 113-116

[56] References Cited

U.S. PATENT DOCUMENTS

| | | | |
|---|---|---|---|
| 2,761,196 | 9/1956 | Graves et al. | 407/34 |
| 4,340,325 | 7/1982 | Gowanlock | 407/116 |
| 4,733,995 | 3/1988 | Aebi | 407/48 |

*Primary Examiner*—Frederick R. Schmidt
*Assistant Examiner*—Jack Lavinder
*Attorney, Agent, or Firm*—Bill C. Panagos; David C. Koris

[57] ABSTRACT

A replaceable insert cutter comprising a cutting body, a plurality of insert pockets in the periphery of the body, each pocket having an insert back locating wall establishing insert circumferential position, a V-shaped support seat establishing a radial and axial position of the insert in a radial threaded screw hole extending through from the V support seat, a cutter insert mounted in the pocket having a back surface engaging the back locating wall, a V base of the insert seated on the support seat, a screw hole and screw extending radially through the insert and retaining engagement with the threaded screw hole, and a radially outermost cutting edge facing circumferentially away from the back surface.

12 Claims, 2 Drawing Sheets

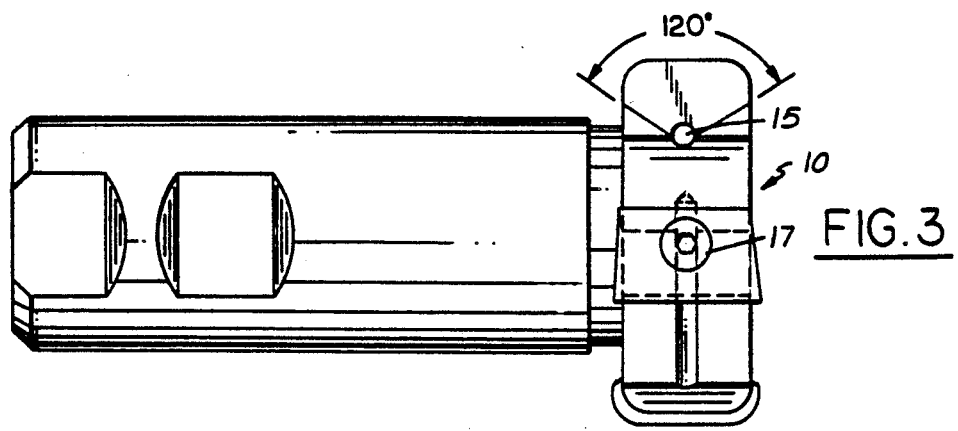
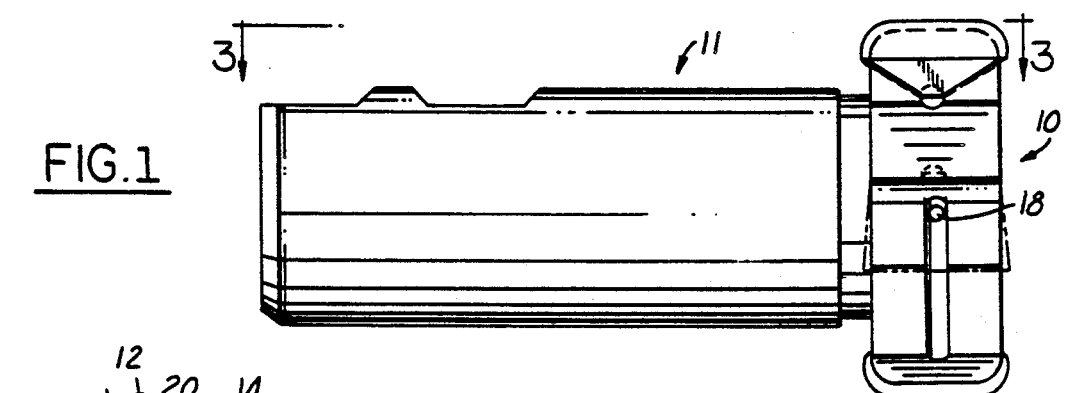
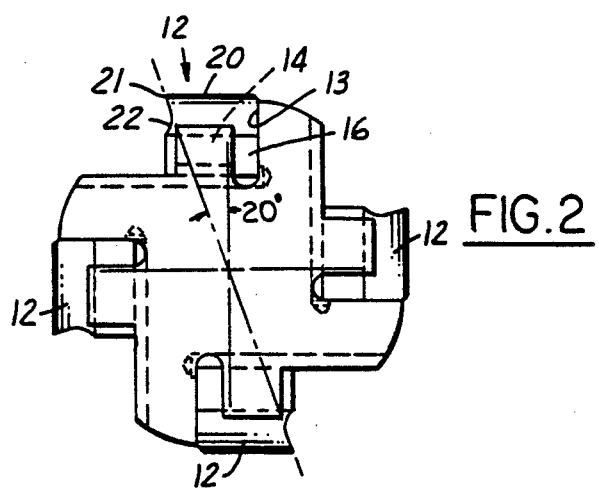
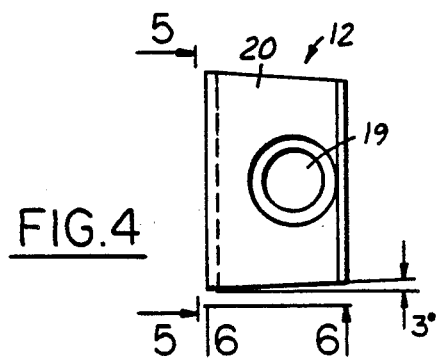
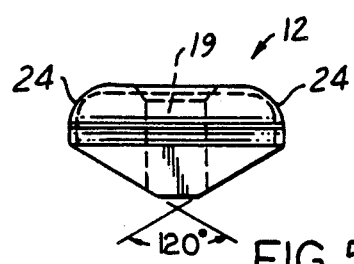
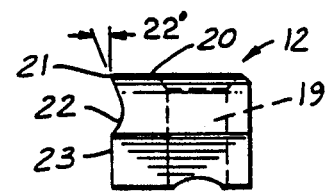

INSERT CUTTER

BACKGROUND OF THE INVENTION

Slotting cutters are known in the art which employ positive rake square indexable blade inserts. The inserts are normally installed "on edge" in pockets by wedge retaining means. For difficult applications, the cutters also accept standard chip splitter inserts which add stability in both single and gang cutter operations and help to reduce or eliminate chatter. Variable-width staggered tooth slotting cutters are also available. The cutters are designed with two keyway slots for gang-milling set-ups and can be used for both rough or finished cutting.

Certain staggered tooth slotting cutters known in the art have double handed straight faced blades set at positive radial rake and alternating positive axial rake angles for maximum cutting efficiency. Axial serrations allow blades to be set our to accomodate a variable range for width maintenance. The double handed blades can be used in either right or left-hand position and are securely anchored by serrated wedges driven in an axial direction.

T-slot cutters are also known having integral staggered teeth.

BRIEF DESCRIPTION OF THE PRESENT INVENTION

The pocket and insert construction of the subject invention have been found to have potential application in slotting cutters, face milling cutters, end mills, as well as in tool holders. Specifically, the subject insert, of special molded configuration eliminating wedge or hold down clamp retention, gives an unobstructed top surface, allowing optimum chip flow, and also allows the maximum number of teeth to be incorporated into a small diameter cutter while providing a simple and very strong pocket configuration to be manufactured with pocket undercuts and hold down screw hole easily reached. A back wall of the pocket provides full back support for the insert. a v-pocket engaged by a central insert holddown screw positively locates the insert in all directions to accommodate the cutting of wide grooves with each insert cutting full width.

Identical construction of pockets and inserts, with appropriate circumferential spacing, can be successfully employed for a shell face mill or alternately in a single insert tool holder.

BRIEF DESCRIPTION OF THE DRAWINGS

FIG. 1 is a side elevation of a slotting cutter equipped with an integral shank shown with one of the inserts omitted to illustrate the pocket;

FIG. 2 is an end view of the cutter with all inserts in place;

FIG. 3 is a view of the cutter along the line 3—3 with another insert omitted;

FIG. 4 is an enlarged outer face view of the insert per se;

FIG. 5 is a cutting face view of the insert along the line 5—5 of FIG. 4;

FIG. 6 is a view of the insert along the line 6—6 of FIG. 4;

DETAILED DESCRIPTION OF PREFERRED EMBODIMENT

Figure 8:
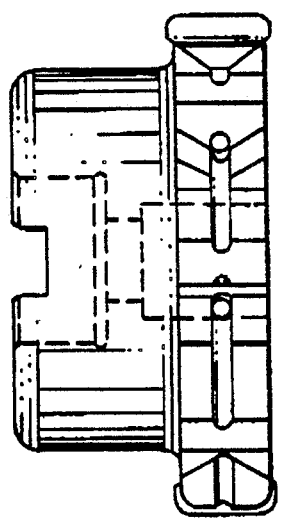
FIG. 8 is a side elevation of the FIG. 7 embodiment.

The cutter of the present invention comprises annular body 10, shank 11 and a plurality of inserts 12, each seated in a pocket in body 10 formed by back wall 13 and obtuse angle related seat surfaces 14. Drilled hole 15, intersecting the juncture of seat surfaces 14, together with slot 16, provide clearance for milling flat seat surfaces providing accurate rigid location for inserts 12 retained by central screws 17 engaging threaded hole 18 in cutter body 10.

With reference to FIGS. 4-6 illustrating an enlarged view of insert 12 per se. beveled screw hole 19 provides a flush outer surface 20 extending to cutting edge 21 formed with a 22° positive rake angle leading to radiused chip flow path 22 and completely open insert cutting face 23.

As shown in FIG. 2, insert location with cutting edge 21 located 20° ahead of center thereby defining an acute angle in the order of about 70°, combined with its 22° positive angle results in an appropriate net 2° positive rake cutting angle with an arcuate exit 22 at approximately ½ of the insert depth for free chip flow in the open space ahead of the insert. As shown in FIG. 4, a 3° clearance angle on each side of insert 12, together with arcuate cutting edges 24 shown in FIG. 5, provide stable, free slot cutting action with excellent chip flow clearance.

Figure 7:
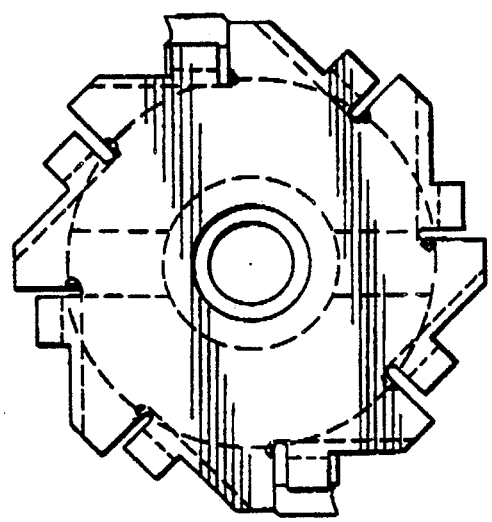
FIG. 7 is an end view of a face mill embodiment of the invention.

With reference to FIGS. 7 and 8, illustrating a face mill embodiment of the invention, an appropriate number of additional inserts may be located on the perimeter of the face mill. The seating pockets, including 120° seats as in the slotting cutter, provide adequate rigid location for withstanding axial components of face mill cutting forces involved.

A simple tool holder, not illustrated, can employ the same basic pocket configuration not only with symmetrical arcuate corner cutting edge, as for left or right-hand lathe tool usage, but also for a variety of other cutting edge forms to meet any specialized requirement, since the basic pocket retention is virtually universal in providing solid retention.

I claim:

1. Replaceable insert cutter comprising a cutting body, a plurality of insert pockets in the periphery of said body, each pocket having an insert back locating wall establishing insert circumferential position, a V-shape support seat establishing a radial and axial position of said insert, and a radial threaded screw hole extending inwardly from the axel of the V-shape support seat, a cutter insert mounted in said pocket having a back surface engaging said back locating wall, a V-shaped base of the insert seated on said support seat, a screw hole and screw extending radially toward the axis of the cutter body through said insert in retaining engagement with said threaded screw hole, and a radially outermost cutting edge facing circumferentially away from said back surface.

2. Cutter of claim 1 wherein said insert has an outer face, extending normal to its back wall and the axis of said screw hole, terminating at said cutting edge with an acute angle insert cutting profile.

3. Cutter of claim 2 wherein said acute angle is in the order of 70°.

4. Cutter of claim 3 wherein said cutting edge is positioned for positive radial rake cutting action.

5. Cutter of claim 4 wherein said positive rake is in the order of 2°.

6. Cutter of claim 5 wherein said cutting edge terminates in symmetrical rounded corners.

7. Cutter of claim 6 wherein said insert is provided with side relief angles in the order of 3°.

8. Cutter of claim 5 wherein the radially outermost cutting edge of said cutting profile leads to an arcuate chip path with an exit at approximately ½ of the radial depth of said insert to provide free chip flow past the extremities of said V-shaped support seat.

9. Cutter of claim 2 wherein said V-shaped support seat extends to the perimeter of said body providing open chip clearance.

10. Cutter of claim 1 wherein said V-shaped support seat is formed with an included angle of approximately 120°.

11. Cutter of claim 1 wherein four insert pockets are provided at 90° spaced positions on said body with insert cutting edges projecting to provide a slotting cutter.

12. Cutter of claim 1 wherein eight insert pockets are provided in said body with 45° spacing and insert cutting edges projecting axially beyond the end of said body to provide a shell face mill.

* * * * *